(12) United States Patent
Pantke et al.

(10) Patent No.: US 7,297,309 B2
(45) Date of Patent: Nov. 20, 2007

(54) PROCESS FOR PRODUCING SILICATIC MOLDINGS

(75) Inventors: Dietrich Pantke, Ratingen (DE); Peter-Nikolaus Schmitz, Langenfeld (DE); Hartmut Melzer, Monheim (DE)

(73) Assignee: H.C. Starck GmbH (DE)

( * ) Notice: Subject to any disclaimer, the term of this patent is extended or adjusted under 35 U.S.C. 154(b) by 497 days.

(21) Appl. No.: 10/813,308

(22) Filed: Mar. 30, 2004

(65) Prior Publication Data

US 2004/0195736 A1    Oct. 7, 2004

(30) Foreign Application Priority Data

Apr. 2, 2003    (DE)    ................. 103 14 977

(51) Int. Cl.
*C04B 35/14* (2006.01)
(52) U.S. Cl. .................................. 264/669
(58) Field of Classification Search ............... 264/669
See application file for complete search history.

(56) References Cited

U.S. PATENT DOCUMENTS

| | | | |
|---|---|---|---|
| 4,746,555 A | 5/1988 | Luckanuck | 428/35 |
| 5,194,087 A * | 3/1993 | Berg | 106/18.12 |
| 5,807,781 A * | 9/1998 | Reinhardt et al. | 428/341 |
| 6,395,113 B2 | 5/2002 | Tomandl | 156/43 |
| 2001/0051428 A1 | 12/2001 | Liu | 438/683 |

FOREIGN PATENT DOCUMENTS

| | | |
|---|---|---|
| DE | 195 42 069 | 5/1996 |
| DE | 198 51 290 | 5/1999 |

* cited by examiner

*Primary Examiner*—Steven P. Griffin
*Assistant Examiner*—Russell J Kemmerle
(74) *Attorney, Agent, or Firm*—Connolly Bove Lodge & Hutz LLP

(57) ABSTRACT

The invention relates to a process for producing a molding, characterized in that a silicatic solid is mixed with a solution comprising a first silicatic binder and the mixture is then press-molded, and the compression molding is then post-treated with a solution comprising a second silicatic binder, and to silicatic moldings obtainable by this process, and also to their use as construction material, insulator material, gasket material or fire-resistant material.

11 Claims, No Drawings

PROCESS FOR PRODUCING SILICATIC MOLDINGS

BACKGROUND

The invention relates to a process for producing silicatic moldings, to silicatic moldings obtainable by this process, and also to their use as construction material, insulator material, gasket material or fire-resistant material.

Silicatic moldings are now used in a very wide range of technical applications, e.g., as insulator materials in the construction sector, for high-temperature gaskets (asbestos replacement) or for molding processes in the foundry industry.

Alongside low-cost production, high mechanical stability requirements have to be met by silicatic moldings in almost all application sectors. Additional criteria depend on the various specific applications. For example, in the construction sector high water resistance combined with minimum combustibility is mostly demanded in addition; in the foundry industry, fire resistance is the most important additional criterion.

The silicatic moldings are usually produced from silicatic raw materials, mostly of natural origin, examples being phyllosilicates or sands, and from various, predominantly inorganic, binders.

Waterglass is often used as an inorganic binder, and has very low cost, and often permits production of moldings with high mechanical stability, and comprises no substances which promote combustibility or smoke generation. However, it has the disadvantage of high water-solubility, and therefore gives materials which lack water resistance. Similar disadvantages result when phosphates are used as inorganic binders, the use of these being likewise frequently described.

Another reason for the particular desirability of the silicatic binders among the inorganic binders group is that they, like the raw materials to be bound, are mainly composed of the environmentally friendly material silicon dioxide, and various recycling methods become available, e.g. in the form of fillers in road building and agriculture. In contrast, other inorganic products give problems in recycling, the used materials mostly having to be disposed of as landfill.

WO-A 97/30951 describes the production of moldings from vermiculites and from inorganic binders, for example in particular from binders comprising phosphoric acid, from phosphates or from waterglass. A degree of water resistance can be achieved only by adding organic binder components, but combustibility factors limit the extent of this addition. For example, panels composed of vermiculites and bound with waterglass and with organic components and having up to 10% by weight of organic component, based on the final product, are unsuitable for insulation systems, such as bulkheads for ships' cargo holds, which are subject to a stringent requirement for water resistance.

DE-A 198 512 90 describes the use of waterglass and pulverulent, exclusively inorganic, binder for vermiculites during the production of non-combustible panels. A disadvantage here is the very high alkali metal silicate content and the correspondingly poor water resistance of the products.

According to U.S. Pat. No. 4,746,555, an improvement can be obtained in the strength of panels based on phyllosilicates when using waterglass by adding phenolic resins and comminuted wood, as long as problems are accepted in relation to fire load, smoke generation, and the disposal of these moldings.

DE-A 195 420 69 describes the binding of silicatic raw materials with a mixture composed of waterglass and of pulverulent silicon dioxide, but water resistance is achieved only via treatment with a silicone-containing hydrophobicizing agent. Although the silicone-containing overlayers are water-repellent, they firstly comprise organic fractions which continue to promote smoke generation, and they secondly also have low mechanical strength and bind poorly to the silicatic substrate.

WO-A 01/051428 describes the addition of organic binders, such as polyurethanes, to give insulation panels high mechanical stability prior to final hardening. Once the organic constituents have been burnt off, the result is a purely inorganic product. However, this additional production step leads to higher manufacturing costs and to environmentally hazardous gases from the burning process. In addition, the final product still lacks adequate moisture resistance.

There is therefore a continued need for silicatic moldings which are mechanically stable and which fulfil the advantageous additional requirements placed upon the appropriate application. By way of example, mention may be made here of high water resistance in combination with minimum combustibility and smoke generation for use in the construction sector, or fire resistance for applications in the foundry industry. Good recycling capability can also be advantageous.

The object is therefore to provide silicatic moldings which comply with the respective appropriate combination of requirements, and to provide a process for their production.

SUMMARY

The invention relates to a process for producing a molding. The process involves (a) mixing a silicatic solid with a solution containing a first silicatic binder, and thereby forming a mixture; (b) press-molding the mixture, and forming a compression molding; and (c) post-treating the compression molding with a solution containing a second silicatic binder.

In one embodiment, the invention relates to moldings.

In another embodiment, the invention relates to insulator materials, fire-resistant materials, support panels for insulator materials and high-temperature gaskets.

These and other features, aspects, and advantages of the present invention will become better understood with reference to the following description and appended claims.

DESCRIPTION

Surprisingly, it has now been found that moldings which fulfill the above-mentioned requirements are obtainable by a process in which a silicatic solid is mixed with a solution comprising a first silicatic binder and the mixture is then press-molded, and the compression molding is then post-treated (sealed) with a solution comprising a second silicatic binder.

The invention therefore provides a process for producing a molding, characterized in that a silicatic solid is mixed with a solution comprising a first silicatic binder and the mixture is then press-molded, and the compression molding is then post-treated with a solution comprising a second silicatic binder.

The sense in which the term "silicatic" is to be understood is that of a material based on silicates, silicic acids, or $SiO_2$, or containing these or consisting essentially of these.

For the purposes of the invention, the term "mixture" can emcompass a suspension or solution. The mixture may be of high viscosity, of very high viscosity, of low viscosity, sol-like, gel-like, homogeneous or heterogeneous.

The module of the first silicatic binder is preferably different from that of the second silicatic binder. The term modulus is known. The person skilled in the art understands modulus in a silicatic binder to be the analytically determinable molar ratio of silicon dioxide ($SiO_2$) and alkali metal oxide $M_2O$ (M=lithium, sodium or potassium) within the solid of the binder.

Suitable silicatic solids are in principle any of the naturally occurring or synthetically prepared silicates, silicic acids, forms of silicic acid, and also $SiO_2$ and its specific forms, and also solids based on these classes of substance. Examples of suitable materials are naturally or synthetically prepared silicatic solids such as silicic acids, pyrosilicic acids, quartzes, sands, amorphous or (semi)crystalline alkali metal silicates and amorphous or (semi)crystalline alkaline earth metal silicates or aluminosilicates (clay minerals), e.g. kaolins, bentonites, talc, mica, feldspars, nephelines, leucites, olivines, andalusites, kyanites, sillimanites, mullites, vermiculites, perlites, pumice, wollastonites, attapulgites and sepiolites, zeolites occurring naturally in sediments, e.g. clinoptilolite, ereonite and mordenite, and also zirconium silicates. Silicates, their systematic features and structures are described by way of example in F. Liebau: "Die Systematik der Silicate," Naturwissenschaften 49 (1962) 481-491, in "Silicon" in K. H. Wedepohl (ed.): Handbook of Geochemistry, Vol. II/3, Chap. 14-A, Springer Verlag, Berlin 1972, pp. 1-32, "Classification of Silicates," in P. H. Ribbe (ed.): Orthosilicates, Reviews in Mineralogy, Vol. 5, Min. Soc. Am., 1980, pp. 1-24.

Preferred silicatic solids are phyllosilicates, such as vermiculites, perlites, or micas. The particularly preferred silicatic solid is vermiculite.

For applications where low densities are demanded, e.g. in the case of insulation panels in the construction sector, particular preference is given to the use of the phyllosilicates in their expanded form. Thus, exfoliated vermiculite with a density from about 0.08 g/cm$^3$ to about 0.16 g/cm$^3$ can for example preferably be used.

The silicatic solids may be used in various particle sizes in the inventive process. For example, vermiculites may thus be used in powder form or as pellets, an example of the average particle sizes ranging from about 1 μm to about 30 mm, preferably from about 1 μm to about 10 mm diameters. Preferred embodiments use commercially available vermiculites.

The silicatic solids are preferably mixed with a solution comprising a first silicatic binder whose modulus is at most about 50, particularly preferably from about 1.5 to about 15, and very particularly preferably from about 1.5 to about 10.

In principle, suitable solvents for the silicatic binders are any of the solvents which do not bring about precipitation of the silicatic binder, nor bring about any binder alteration disadvantageous for the inventive process. Preferred suitable solvents for the silicatic binders are water or alcohols, such as methanol, ethanol, propanol, isopropanol and higher homologues, and also mixtures of these in any desired mixing ratios. Water is a particularly preferred suitable solvent for the silicatic binders.

For the purposes of the invention, solutions comprising silicatic binders may also be stable suspensions, sols or gels, or else colloidal solutions or colloidal dispersions, for example silica sols. Silica sols and their production are known to those skilled in the art. Silica sols are commercially obtainable, such as for example the products obtainable from H. C. Starck GmbH under the trade name Lewasil®.

Silicic acid sols are colloidal solutions of amorphous silicon dioxide in water, which are also referred to as silicon dioxide sols, but usually however briefly as silica sols, the silicon dioxide being in the form of spherical particles which are superficially hydroxylated. The particle diameter of the colloidal particles is usually 1 to 200 nm and the specific BET surface area (determined by the method described by G. N. Sears, Analytical Chemistry Vol. 28, N. 12, 1981-1983, December 1956) correlating with the particle size is 15 to 2000 m$^2$/g. The surface of the $SiO_2$ particles has a charge which is compensated for by a corresponding counter-ion which leads to the stabilization of the colloidal solution.

Frequently silica sols are stabilized anionically and with alkalizing agents. Such silica sols have a pH value of 7 to 11.5 and contain, for example, as alkalizing agents small quantities of $Na_2O$, $K_2O$, $Li_2O$, ammonia, organic nitrogen bases, tetraalkyl ammonium hydroxides or alkali metal or ammonium aluminates. Anionic silica sols can also be present in a slightly acidic form as semistable colloidal solutions.

By coating the surface with suitable salts, such as for example $Al_2(OH)_5Cl$, it is also possible to produce silica sols with cationically charged particles.

The production process for silica sols essentially includes the production steps comprising the dealkalization of waterglass by means of ion exchange, the adjustment and stabilization of the particle size (distribution) of the $SiO_2$ particles required in each case, the adjustment of the $SiO_2$ concentration required in each case and optionally the surface modification of the $SiO_2$ particles, such as for example with $Al_2(OH)_5Cl$. In none of these steps do the $Si_2O$ particles lose their colloidally dissolved state. This explains the presence of the discrete primary particles having for example high binder effectiveness.

By way of example of silicatic binders for the purposes of the invention, use may be made of soluble alkali metal silicates, silicic acids, $SiO_2$ in any desired modification and form, or of a mixture composed of these. By way of example, mention may be made here of the commercially available waterglass, such as sodium waterglass or potassium waterglass, and the commercially available unmodified or modified silica sols. Examples which may be mentioned in this context are waterglasses, such as for example the commercially obtainable sodium silicates or potassium silicates and non-modified or modified silica sols, and preferably those which are commercially obtainable.

In preferred embodiments of the inventive process, the solution used of a first silicatic binder comprises waterglass, where appropriate in a mixture with silicon dioxide, preferably in the form of silica sol, and, where appropriate, with additional solvent.

The solutions comprising silicatic binders can be prepared by processes known to the person skilled in the art. By way of example, a suitable solution comprising a silicatic binder may be prepared by mixing of alkali metal silicates or solutions of alkali metal salts, e.g. waterglass, such as sodium waterglass or potassium waterglass, or of other water-soluble alkali metal silicates, or solutions of these, with silicon dioxide and, where appropriate, adding additional solvent, where appropriate with subsequent post-treatment of this solution, e.g. by stirring, where appropriate with heating. The selection of the mixing ratio of alkali metal silicate and silicon dioxide for preparing the first binder is such that this has a modulus of at most 50, preferably from 1.5 to 15, and very particularly preferably from 1.5 to 10, and the selection for preparing the second binder is such that this has a modulus of at least 10, preferably from 20 to 1000, particularly preferably from 50 to 200.

The silicon dioxide here is used in the form of precipitated silicas, fumed silicas, or silica sols, for example. It is preferably used in the form of silica sol.

The solution comprising a first silicatic binder preferably has a solids content of from 5 to 60% by weight, with preference from 20 to 55% by weight, based on the total weight of the solution.

The mixture composed of the silicatic solid to be bound and of the solution comprising a first silicatic binder comprises an amount of the first silicatic binder such that the solids content of the silicatic binder is from 1 to 20% by weight, preferably from about 2 to about 15% by weight, particularly preferably from 4 to 12% by weight, based on the weight of the resultant molding prior to the post-treatment. In preferred embodiments in which the silicatic solid used comprises one with high absorbency, and therefore with low density, for example a highly expanded vermiculite, the mixture composed of silicatic solids to be bound and of the solution comprising a first silicatic binder may comprise an amount of the first silicatic binder such that the solids content of the silicatic binder is from 1 to 50% by weight, preferably from 2 to 35% by weight, particularly preferably from 4 to 25% by weight, based on the weight of the resultant molding prior to the post-treatment.

By way of example, suitable machines, such as paddle mixers, may be used to mix the solution comprising the first silicatic binder with the silicatic solid.

The mixture composed of silicatic solid and of the solution comprising the first silicatic binder is press-molded at from 20 to 200° C., preferably from 20 to 120° C. The press-molding may take place continuously or batchwise, and may use the usual processes known to the person skilled in the art. By way of example, use may be made of the presses introduced for chipboard production and of the corresponding processes, the method being described by way of example in Ullmann's Encyclopedia of Industrial Chemisty (1996) Vol. A28, pp. 331-333.

Even a very low pressure is sufficient to achieve adequate initial strength of the compression molding prior to the post-treatment. Adequate initial strength is present if the compression molding is not damaged, and certainly not destroyed, by the subsequent post-treatment, i.e. by way of example during immersion or saturation with the second silicatic binder does not break apart or undergo complete breakdown. In preferred embodiments of the inventive process, pressures of at least 2 kg/cm$^2$ are used. However, it is also possible to use pressures smaller than 2 kg/cm$^2$ in other preferred embodiments.

The resultant solvent-containing molding may be dried after the compression procedure and prior to the post-treatment. This intermediate drying may take place at temperatures of from 10 to 200° C., preferably from 20 to 150° C. By way of example, drying at room temperature is possible, as is drying at an elevated temperature, e.g. in appropriate drying cabinets, drying rooms, or ovens. Freeze drying may also be used, as long as this does not damage the compression molding. In preferred embodiments, the compression molding is dried prior to the post-treatment. This is advantageous particularly when the strength of the compression molding is to be increased prior to the post-treatment. This method can also give an adequate initial strength for the subsequent post-treatment. The drying time may be varied, depending on the drying temperature and the desired degree of drying.

In one preferred embodiment, the initial strength may also be raised by exposure to $CO_2$. By way of example, this process is known in the foundry industry from the binding of core sand, using waterglass.

According to the invention, the press-molding is followed by the post-treatment (sealing) of the resultant molding with a solution comprising a second silicatic binder (sealing agent).

The second silicatic binder can either be identical to or different from the first silicatic binder. The modulus of the second silicatic binder is preferably higher than that of the first silicatic binder. The modulus of the second silicatic binder is preferably at least about 10, particularly preferably from about 20 to about 1000, very particularly preferably from about 50 to about 200.

The solution comprising the second silicatic binder preferably has a solids content of from about 5 to about 60% by weight, particularly preferably from about 20 to about 55% by weight, based on the total weight of the solution.

In preferred embodiments of the inventive process, the solution of a second silicatic binder comprises a silica sol, where appropriate in a mixture with waterglass and, where appropriate, with further additional solvent.

The post-treatment may take place via immersion, soaking, spray-application or spread-application and subsequent drying, where appropriate under pressure. The duration of the post-treatment depends on the process. In the case of an immersion or saturation process, by way of example, sufficient binder liquid may have been absorbed after as little as a few seconds. However, use may also be made of longer post-treatment times of up to two or more hours. Like the intermediate drying described above of the compression molding prior to the post-treatment, the drying may take place at temperatures of from 10 to 200° C., preferably from about 20 to about 150° C. By way of example, it may likewise take place at room temperature or at an elevated temperature, e.g. in appropriate drying cabinets, drying rooms or ovens. Freeze drying is also possible as long as it does not damage the post-treated molding. The drying time may be varied depending on the drying temperature. Possible drying times here are from a few minutes or hours to two or more days, or even weeks.

When comparison is made with the content of first silicatic binder solid in the molding after the press-molding process, the result of the post-treatment is that the total content of first and second silicatic binder solids is raised to from about 2 to about 40% by weight, preferably to from about 5 to about 30% by weight, particularly preferably to from about 8 to about 25% by weight, based on the weight of the resultant molding after the post-treatment. In preferred embodiments in which the silicatic solid used comprises one with high absorbency, and therefore with low density, e.g. a highly expanded vermiculite, it is possible—when comparison is made with the content of first silicatic binder solid in the molding after the press-molding process—for the post-treatment to increase the total content of first and second silicatic binder solids to from about 2 to about 60% by weight, preferably to from about 5 to about 45% by weight, particularly preferably to from about 8 to about 35% by weight, based on the weight of the resultaint molding after the post-treatment.

The present invention also provides moldings, characterized in that they comprise a total content of from about 2 to about 40% by weight, preferably from 5 to about 30% by weight, particularly preferably from about 8 to about 25% by weight, of silicatic binders, based on the total weight of the molding, and comprise a content of from about 60 to about 98% by weight, preferably from about 70 to about 95% by weight, particularly preferably from about 75 to about 92% by weight, of silicatic solid, based on the total weight of the molding.

Moldings according to the invention are also those which essentially consist of silicatic components, i.e. a silicatic solid and a silicatic binder or optionally reaction products thereof which have been produced by mixing the components and/or as a result of the process for producing the molding, e.g. temperature treatment, molding, etc. Preferably such moldings are those which contain less than about 2% by weight, preferably less than about 1% by weight, and particularly preferably less than about 0.1% by weight of organic components, based on the total weight of the molding. Particularly preferably the moldings according to the invention are those having a total content of silicatic binders of 2 to 40% by weight, preferably 5 to 30% by weight and particularly preferably 8 to 25% by weight, based on the total weight of the molding and a content of the silicatic solid of 60 to 98% by weight, preferably 70 to 95% by weight, and particularly preferably 75 to 92% by weight, based on the total weight of the molding, with the proviso that the sum of the two contents is 100% by weight.

In a preferred variant the moldings according to the invention have such an alkali metal gradient that the outer layer of the molding has a lower content of alkali metal ions in its composition than the interior of the molding.

The inventive post-treatment with the solution of a second binder raises the mechanical strength of the inventive molding, or of the molding produced by the inventive process, when comparison is made with its strength after the press-molding process, and achieves a strength which is not obtainable solely via an increase in the solids content of the first silicatic binder in the first binding step. The inventive post-treatment with the solution of a second binder moreover gives greater water resistance to the inventive molding or to the molding produced by the inventive process. These advantageous properties, in particular the increased water resistance, of the inventive moldings or of the moldings obtainable by the inventive process are achieved without admixture of organic components, such as organic binders or other organic additives, which in known moldings either remain present, as described in U.S. Pat. No. 4,746,555 for example, or else have to be removed from the moldings subsequently via complicated processes, as described in WO-A 01/051428, for example.

The inventive moldings or the moldings obtainable by the inventive process are moreover non-combustible and do not generate smoke in the event of a fire.

The use of expandable silicatic solids, e.g. vermiculites, perlites, or mica, preferably vermiculites, can give porous moldings which have very good mechanical properties, even at very low density. The porous silicatic moldings generally have densities of from about 0.2 to about 2.0 g/cm$^3$, preferably from about 0.3 to about 1.5 g/cm$^3$ and particularly preferably from about 0.4 to about 1.2 g/cm$^3$.

The present invention also provides moldings obtainable by the inventive process described above. In this context, all of the preferred ranges which apply to the inventive process are also applicable, individually or in any desired combination, to the moldings obtainable by this process. The present invention preferably provides moldings produced via the inventive process described above.

Inventive moldings or moldings obtainable by the inventive process may be panels, blocks, trays, shells, tubes or half-shells. The inventive moldings or moldings obtainable by the inventive process may be used for many purposes, as construction material, insulator material, high-temperature gasket material or fire-resistant material. The inventive moldings are preferably used as support panels for various insulator materials, e.g. polystyrene blocks, polyurethane blocks, or mineral fibre mats (e.g. rock fibre). It is also particularly advantageous that the surface of the inventive moldings or of the moldings obtainable by the inventive process is particularly suitable for adhesive-bonding to other materials conventionally used in the insulation sector, for example metals or metal foils.

The inventive moldings or the moldings obtainable by the inventive process are moreover used as insulator materials with thermally insulating action, and as fire-resistant materials.

It is also possible for the inventive moldings or the moldings obtainable by the inventive process to be used in the foundry industry and as high-temperature gaskets.

The invention is further described in the following illustrative examples in which all parts and percentages are by weight unless otherwise indicated. The examples listed below serve to illustrate the invention but are not be be interpreted as a restriction.

EXAMPLES

Example 1

Preparation of a Solution Containing a First Silicatic Binder with Modulus 6.

To prepare a solution containing a silicatic binder with modulus 6, 56.1 g of potassium waterglass (potassium waterglass 35, Cognis Deutschland GmbH) are mixed with 19.9 g of 50% strength silica sol (Levasil® 50/50%, H.C. Starck GmbH) and 22.4 g of deionized water for one minute at 20° C., using a magnetic stirrer. This gave a solution with 30.0% by weight content of silicatic binder solids.

Example 2

Preparation of a Solution Containing a Second Silicatic Binder

To prepare a solution containing a silicatic binder with modulus 50, 2.8 g of potassium waterglass (potassium waterglass 35, Cognis Deutschland GmbH) were mixed in accordance to Example 1 with 19.9 g of 50% strength silica sol (Levasil® 50/50%, H.C. Starck GmbH) and 14.0 g of deionized water. This gives a solution with 30.0% by weight content of silicatic binder solids.

Example 3

Preparation of an Inventive Molding Composed of Vermiculite with a First Binder with Modulus 6 and with a Second Binder with Modulus 50

100 parts by weight of a vermiculite with an average grain size of about 1 mm (Vermiculit SFX, Micronized Products (PTY) Ltd) were mixed with 20 parts by weight of a solution including a first silicatic binder according to Example 1 (an aqueous alkali metal silicate solution with a modulus of 6 and a solids content of 30% by weight), using a kitchen machine (Braun Multipraktic 120, operating unit: whisk). Adequate homogenization was achieved after five minutes.

2.2 g of the resultant material were press-molded in a ram press at 20° C. The ram diameter is 20 mm, the press displacement is 50 mm and the weight applied is 22.3 kg. This gives a pressure of 7.1 kg/cm$^2$.

The resultant compression molding was dried to constant weight at 110° C.

The resultant molding was soaked for 5 seconds in the solution including a second silicatic binder according to Example 2 (an aqueous alkali metal silicate solution with a modulus of 50 and with a solids content of 30% by weight).

Finally, the resultant molding was again dried at 110° C. to constant weight.

This gave an inventive molding of diameter 20 mm, thickness 10 mm (tablet shape) and density 0.9 g/cm$^3$. The total binder content is 23% by weight, based on the total weight of the molding.

The molding had very good mechanical strength together with very good water resistance, and was non-combustible, and generated no smoke, even at red heat.

Mechanical strength was determined using a 2E/20S tablet hardness tester from Schleuniger. The maximum force applied was 20 kp. The tablets were clamped horizontally within the apparatus.

The force reached in the case of the present Example 3 was 17 kp.

Combustibility and smoke generation were assessed visually after one minute of contact with an open flame from a commercially available gas cartridge burner. The flame temperature during the tests was 900-1000° C.

In the case of the molding of Example 3, neither any combustibility nor any smoke generation were found.

To test water resistance, in each case a molding is stirred in 100 ml of water in a sealed bottle. The criterion here is the time expired before the first visually discernible release of particles and extending to the complete breakdown of the molding.

In the case of the molding of Example 3, release of the first particles occurred after 14 days, and the complete breakdown occurred after 100 days.

Example 4

Production of an inventive molding from vermiculite, using 35% strength potassium waterglass (Cognis Deutschland GmbH) as First Binder and Levasil® 300/30% (H.C. Starck GmbH) as second binder 100 parts by weight of SFX vermiculite are mixed with 20 parts by weight of potassium waterglass 35 in accordance with the procedure in Example 3, and compression-molded and dried, soaked in Levasil® 300/30%, and finally dried.

This gave a molding (18% by weight binder content, based on the total weight of the molding, other measurements being as in Example 3) with very good mechanical strength (>20 kp) and very good water resistance (first release of particles after 30 days, complete breakdown >100 days). The molding is non-combustible and generates no smoke.

Example 5

Preparation of a high-concentration potassium waterglass with about 55% solids content 2500 g of potassium hydroxide (platelets, >85%) and 430 g of water are mixed in a 6-litre three-necked flask and treated, with cooling and vigorous stirring, with 5130 g of Levasil® 50/50% (H.C. Starck GmbH).

After 3 h the result is a potassium waterglass with about 55% solids content and a modulus of about 2.3.

Example 6

Production of an inventive molding from vermiculite, using high-concentration potassium waterglass as first binder and Levasil® 300/30% as second binder A procedure according to Examples 3 and 4 gave a molding (19% by weight binder content, based on the total weight of the molding) with very high mechanical strength (>20 kp) and very good water resistance (first release of particles after 100 days, final breakdown >100 days). The molding was non-combustible and generated no smoke.

Example 7

Preparation of a solution containing a first silicatic binder with modulus 10.

To prepare a solution containing a silicatic binder with modulus 10, 57.0 g of potassium waterglass (potassium waterglass 35, Cognis Deutschland GmbH) are mixed with 99.9 g of 30% strength silica sol (Levasil® 300/30%, H.C. Starck GmbH) at 20° C. for one minute, using a magnetic stirrer. This gave a solution with 33.0% by weight content of solid silicatic binder.

Example 8

Preparation of an inventive molding from mica, using a silicatic binder with modulus 10 as first binder and Levasil® 300/30% as second binder 60 parts by weight of mica with low particle size (60 mesh, Micronized Products Pty) were mixed with 25 parts by weight of a solution containing a first silicatic binder according to Example 7 (an aqueous alkali metal silicate solution with a modulus of 10 and a solids content of 33% by weight) according to the procedure in Example 3 and compression-molded and dried, saturated in Levasil® 300/30%, and finally dried.

This gives a molding (40% by weight binder content, based on the total weight of the molding, other measurements being the same as those in Example 3) with very good mechanical strength (>20 kp) and very good water resistance (first release of particles after 50 days, complete breakdown >100 days). The molding is non-combustible and generates no smoke.

COMPARATIVE EXPERIMENTS

For comparative purposes, moldings are produced from vermiculite with potassium waterglass 35 or sodium waterglass 37/40 (Cognis Deutschland GmbH), and mixtures of these with up to 10% by weight of commercially available polyacrylates, such as Mowilith DM 60 (Celanese AG), as organic binder component, with no post-treatment.

The single-stage comparative experiments give moldings of comparable, but significantly less advantageous, strength, also termed mechanical strength hereinafter, water resistance, combustibility, and/or smoke generation.

Comparative Example 1

Production of a molding from vermiculite, using potassium waterglass as binder with no post-treatment 100 parts by weight of a vermiculite (type as in Example 3) are mixed with 20 parts by weight of potassium waterglass 35 (Cognis Deutschland GmbH, 35% solids content, modulus about 3.4) as in Example 3. Compression molding and drying likewise take place as in Example 3. There is no post-treatment.

This gives a molding (6.5% by weight binder content, based on the total weight of the molding, other measurements being as in Example 3) with good mechanical strength (12 kp), which is non-combustible and generates no smoke but has very poor water resistance (first release of particles after 2 days, complete breakdown after 7 days).

Comparative Example 2

Production of a molding from vermiculite, using a waterglass/polyacrylate mixture as binder with no post-treatment 100 parts by weight of a vermiculite (type as in Example 3) are mixed with 40 parts by weight of a 1:1 mixture of potassium waterglass 35 and Mowilith DM 60. The process continues as in Comparative Example 1.

This gives a molding (6.5% by weight inorganic and 10% by weight organic binder content, based on the total weight of the molding, other measurements being as in Example 3) with good mechanical strength (>20 kp). The molding has low combustibility but generates smoke and also has poor water resistance (first release of particles after 3 days, complete breakdown after 35 days).

The vermiculite moldings produced according to the invention from Examples 3, 4 and 6 differ from the moldings produced in Comparative Examples 1 and 2 with no post-treatment firstly in higher mechanical strength and higher water resistance and secondly in non-combustibility and no generation of smoke.

Comparative Example 3

Production of a molding from vermiculite, using potassium waterglass 35 as first and second binder.

For further comparison, a molding is produced from vermiculite, using potassium waterglass or sodium waterglass as first and second binder.

A molding (23% by weight binder content, based on the total weight of the molding) with very high mechanical strength (>20 kp) is obtained from a procedure according to Examples 3, 4 and 6. The molding is non-combustible and generates no smoke. However, it has poor water resistance (first release of particles after 3 days, complete breakdown after about 50 days). Furthermore, material cakes onto the compression mold.

The vermiculite moldings produced according to the invention from Examples 3, 4 and 6 differ from the moldings bound only with potassium waterglass from Comparative Example 3 in markedly better water resistance, while mechanical strength properties and fire performance are equally good.

Comparative Example 4

Production of a molding from mica, using a silicatic binder with modulus 10 with no post-treatment For further comparison, a molding is produced from mica, using a binder with modulus 10 with no post-treatment.

60 parts by weight of mica (type as in Example 8) are mixed with 25 parts by weight of a solution containing a first silicatic binder according to Example 7 (an aqueous alkali metal silicate solution with a modulus of 10 and with a solids content of 33% by weight) according to the procedure in Example 3, and compression-molded and dried. The process continues according to Comparative Example 1.

This gives a molding (12% by weight binder content, based on the total weight of the molding, other measurements being as in Example 8) with poor mechanical strength (4 kp) and with very poor water resistance (first release of particles after 1 day, complete breakdown after 50 days). The molding is non-combustible and generates no smoke.

The mica molding produced according to the invention from Example 8 differed from the molding of Comparative Example 4, bound in one stage with no post-treatment, in markedly better mechanical strength and water resistance.

Although the present invention has been described in detail with reference to certain preferred versions thereof, other variations are possible. Therefore, the spirit and scope of the appended claims should not be limited to the description of the versions contained therein.

What is claimed is:

1. A process for producing a molding comprising:
 (a) mixing a silicatic solid with a solution containing a first silicatic binder, and thereby forming a mixture;
 (b) press-molding the mixture, and forming a compression molding; and
 (c) post-treating the compression molding with a solution containing a second silicatic binder, wherein the second silicatic binder comprises a binder having a modulus that is at least 10.

2. The process according to claim 1, wherein the second-silicatic binder has a higher modulus than the first silicatic binder.

3. The process according to claim 1, wherein the first silicatic binder used comprises one whose modulus is at most 50.

4. The process according to claim 1, wherein the first silicatic binder used comprises a binder having a modulus ranging from 1.5 to 10.

5. The process according to claim 1, wherein the second silicatic binder used comprises a binder having a modulus ranging from 20 to 1000.

6. The process according to claim 1, wherein the solution comprising the first silicatic binder has a solids content ranging from 5 to 60% by weight.

7. The process according to claim 1, wherein the solution containing the second silicatic binder has a solids content ranging from 5 to 60% by weight.

8. The process according to claim 1, wherein the post-treatment with the solution comprising the second silicatic binder takes place a technique selected from the group consisting of (i) via soaking, (ii) spray-application, (iii) spread-application, and (iv) combinations thereof, and the process farther comprises a step of subsequent drying.

9. The process according to claim 1, wherein the silicatic solid is a phyllosilicate.

10. The process according to claim 1, wherein the silicatic solid is a silicatic component selected from the group consisting of vermiculite, perlite, mica, 5 and combinations thereof.

11. The process according to claim 10, wherein the silicatic solid is a vermiculite.

* * * * *

UNITED STATES PATENT AND TRADEMARK OFFICE
CERTIFICATE OF CORRECTION

PATENT NO. : 7,297,309 B2
APPLICATION NO. : 10/813308
DATED : November 20, 2007
INVENTOR(S) : Dietrich Pantke et al.

It is certified that error appears in the above-identified patent and that said Letters Patent is hereby corrected as shown below:

In the Claims:

In Claim 10, in column 12 Line 59, please delete "5."

Signed and Sealed this

First Day of April, 2008

JON W. DUDAS
*Director of the United States Patent and Trademark Office*